Patented July 18, 1939

2,166,240

UNITED STATES PATENT OFFICE 2,166,240

HETEROCYCLIC COMPOUNDS

Charles Enrique Dent, London, England, assignor to Imperial Chemical Industries Limited, a corporation of Great Britain No Drawing. Application April 26, 1938, Serial No. 204,464. In Great Britain April 30, 1937

18 Claims. (Cl. 260—314)

The present invention relates to the manufacture of new heterocyclic compounds which have an intense colour and are useful in themselves as pigments. They are also adapted to be converted by further treatment into other colouring matters.

The researches on natural products of Fischer and others during the past 20 years or so have shown that a wide variety of highly coloured compounds occurring in nature and their derivatives, degradation products, etc. contain the characteristic structure represented by the following, known as the porphin structure:

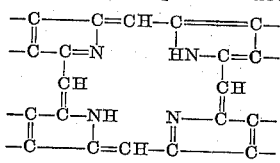

More recent investigations of Linstead and others (see Journal of the Chemical Society 1934, pages 1016–1039, 1936, pages 1719–1736 and 1739–1748, 1937, pages 911–936) have developed a class of blue and green colouring matters known as phthalocyanines. These products contain the same central ring structure as the porphins except that instead of there being four methine groups linking the pyrrol radicals there are nitrogen atoms. The latter compounds, commonly known as phthalocyanines, are with more systematic precision named tetra-aza-porphins, the term aza being used to indicate that in place of a methine group in a heterocyclic ring there is a nitrogen atom. Still more recently Helberger in Annalen 1937, 529, 205 in a publication made in Great Britain on May 3, 1937, has described other compounds of the porphin series in which in the place of one or two of the methine groups of the parent porphin ring there are nitrogen atoms. His products therefore are called mono- and di-aza-porphins. The present invention relates to the manufacture of triaza-porphins, and, therefore, to the last possible member of the class of porphins, namely the series of colouring matters in which three of the methine groups are replaced by nitrogen atoms. As will be brought out more completely in this application, methods have been devised for obtaining these tri-aza-porphins in technically satisfactory yield. The present application therefore relates to a new class of colouring matters comparable in importance with the tetra-aza-porphins and completes the discovery of all four members of the aza-porphin series, namely, the mono-, di-, tri- and tetra-aza-porphins.

According to the present invention we cause to interact together an o-dinitrile of the benzene or naphthalene series, a methylene phthalimidine or a compound or mixture of compounds capable of generating such methylene phthalimidine in the conditions of the reaction, and a substance consisting of or containing a metal.

As compounds capable of generating a methylene phthalimidine in the conditions of the reaction there may be mentioned, for example, phthalimidylacetic acid, its salts with metals such as copper, 4-chlorophthalimidylacetic acid, and o-acetylbenzamide.

The nature of the invention will be shown in more detail by reference to the constitutional formula of one of the products thereof. The compound in question is copper tetrabenztriazaporphin and may be represented by the formula

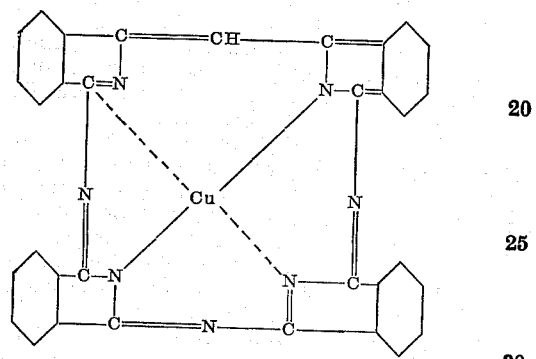

As will be seen, this formula corresponds exactly with that of copper phthalocyanine (see Linstead et al., Journal of the Chemical Society, 1934, page 1035) except that in the above formula a methine group appears instead of a nitrogen atom which in the Linstead formula referred to represents one of the nitrogen atoms of the large ring (cf. here Journal of the Chemical Society, 1936, page 1746).

The invention is based on the discovery that when phthalodinitrile and methylene-phthalimidine and a substance consisting of or containing a metal are mixed together in suitable proportions and the mixture is heated, then, as is indicated by the formula, three molecules of the phthalodinitrile, one molecule of the hypothetical radical of formula:

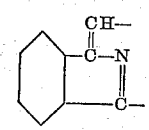

and one atom of the metal join together, seemingly necessarily simultaneously, to form a compound the molecule of which has the typical structure depicted.

It is to be understood, however, that the o-dinitrile and the methylene phthalimidine (or equivalent compound) do not necessarily combine together in the proportions in which they are present in the initial mixture. Thus, for instance, it is possible to make copper tetrabenztriazaporphin by heating mixtures of cuprous chloride, phthalodinitrile and methylene phthalimidine in which the molecular radio of phthalodinitrile to methylene phthalimidine may be 3:1 or 1:1 or may have some other value.

In carrying the invention into practical effect the reagents are conveniently mixed together in finely divided form, and the mixture so obtained is either heated as such to the reaction temperature or is heated in admixture with a liquid diluent. As there is a tendency for the methylene phthalimidine to interact with itself it is preferable either to heat quickly or to add the powdery mixture to an already heated reaction medium.

The products of the invention, namely the tetrabenz-triaza-porphins are highly coloured compounds, resembling in most of their properties the phthalocyanines. They are suitable for use as pigments. They may also be converted by suitable treatment into other useful compounds.

By a further feature of the invention tetrabenz-triaza-porphins are converted into sulphonic acids by treatment with strong sulphonating agents, e. g., fuming sulphuric acid. The salts, e. g., alkali metal salts, of these tetra-benztriaza-porphin-sulphonic acids are soluble in water and their aqueous solutions dye cotton, wool and acetate rayon in bright green shades. The barium or other suitable lakes of these sulphonic acids may be used, with or without admixture of white pigment (e. g., blanc fixé) in the surface colouring of paper.

By a still further feature of the invention tetrabenz-triaza-porphins are halogenated (i. e., chlorinated or brominated) to give new compounds, i. e., mono- or poly-chloro or -bromo-tetrabenz-triaza-porphins, differing from their parents in colour. In carrying this feature of the invention into practice the tetrabenz-triazaporphins are dissolved or suspended in a solvent or diluent, for example nitrobenzene or molten phthalic anhydride at an elevated temperature, for example 200°–300° C., and a stream of chlorine gas is passed through the liquid or bromine or a solution of bromine (for example in nitrobenzene) is added. Heating is continued, with addition of more halogen as needed, until the halogenation has proceeded to the desired stage.

In some cases, the time required for halogenation to any given stage is diminished if there is added to the reaction mixture a suitable halogen carrier, for example, antimony trisulphide.

In some cases, as when the introduction of a large number of bromine atoms into the molecule of metal-free tetrabenztriazaporphin is in question, it is preferable, because the reaction may be violent, to carry out the reaction in two stages, the first stage being conducted in a solvent or diluent and the second stage in a sealed pressure vessel.

The invention is illustrated but not limited by the following examples in which the parts are by weight.

Example 1

5 parts of methylene phthalimidine (prepared by heating phthalimidylacetic acid with water), 4.4 parts of phthalodinitrile and 2.3 parts of cupric chloride (dried to constant weight at 100° C.) are finely powdered and then mixed together and heated quickly to 250° C. The temperature is then taken to 270° C. during 15 minutes. The mixture becomes molten, froths and sets, becoming dark coloured. The cooled mass is powdered. It is well washed with ethanol to remove brown impurities which dissolve. The dark green powder which remains is dissolved in 20 times its own weight of concentrated sulphuric acid and the dark brown solution so obtained is poured into much boiling water. The precipitate is filtered off and washed with hot water until free from acid. It is thus obtained in a finely-divided state. The aqueous greenish blue paste presents the compound in suitable form for eventual incorporation into paints, lacquers and printing inks which it colours in green shades of good light fastness. When the paste is dried a dark bluish green solid is obtained.

The new compound is extremely stable to heat. It may be crystallised from boiling chloro-naphthalene to give purple needles having a "coppery" lustre. When the compound is analysed results are obtained which show that the empirical formula is $C_{33}H_{17}N_7Cu$, which corresponds with the structural formula given above for copper-tetrabenz-triaza-porphin.

Example 2

This example relates to the use of phthalimidylacetic acid instead of methylene-phthalimidine. As is indicated in Example 1, phthalimidylacetic acid easily decomposes with evolution of carbon dioxide and formation of methylene-phthalimidine.

13 parts of phthalimidylacetic acid (see Berichte der deutschen Chemischen Gesellschaft, 1877, vol. 15, pages 1556 and 1884, vol. 17, page 2623), 8.8 parts of phthalodinitrile and 1.7 parts of magnesium turnings are mixed and added to 100 parts of boiling chloronaphthalene. The mixture froths and carbon dioxide and steam are evolved. The mixture is then heated for 2 hours under a reflux condenser at such a temperature that the chloronaphthalene boils. A greenish colour gradually develops and the solution finally obtained has an intense olive green colour. It is cooled and diluted with 200 parts of benzene. A green compound is precipitated and filtered off. The dark green paste so-obtained is washed with benzene and dried, conveniently at 90° C. The compound so-obtained contains combined magnesium; it is magnesium tetrabenztriazaporphin.

The compound may be used as such or may be further treated to give a "metal-free compound. Thus, 1 part of the above new compound is dissolved in 10 parts of concentrated sulphuric acid and the solution so-obtained is poured into 100 parts of water at 90° C. There is thus obtained a finely-divided green precipitate which is filtered off and washed with hot water until free from acid. The bluish green paste so-obtained may be used directly for incorporation into paints and lacquers. When the paste is dried the compound is obtained in solid form, as a dark green mass. This compound contains no magnesium; it is tetrabenztriazaporphin.

Example 3

13 parts of phthalimidylacetic acid, 8.8 parts of phthalodinitrile and 6 parts of cuprous chloride are finely powdered and mixed together and the mixture is gradually added during 15 minutes to 100 parts of boiling chloronaphthalene in a vessel provided with a reflux condenser. The temperature of the mixture is maintained at 260° C. for a further half hour. A green colour develops and the reaction mass becomes thick. It is then cooled and filtered. The residue is washed first with benzene and then with acetone and is then dried, conveniently at 90° C. There is thus obtained copper tetrabenztriazaporphin in the form of purple lustrous crystals.

It may be obtained in the form of a finely dispersed aqueous paste suitable for incorporation into paints and lacquers by dissolving it in sulphuric acid and pouring the solution so obtained into water as described in Example 1. When this aqueous paste is dried a green powder is obtained.

If in the process of this example there are used 17.9 parts of 4-chlorophthalimidylacetic acid instead of the 13 parts of phthalimidylacetic acid, and the reaction mixture is heated for 1½ hours, there is obtained, after washing and drying as described above, a bluish green powder which dissolves in chloronaphthalene to give a green solution. The compound so made contains combined halogen. It dissolves in sulphuric acid to give a yellowish brown solution.

If this solution is poured into much water a flocculent green precipitate is formed. If the mixture is filtered and the residue is washed with water, an aqueous paste is obtained which presents the new compound in a form suitable for incorporation into paints and lacquers.

Example 4

13 parts of phthalimidylacetic acid, 7.4 parts of phthalodinitrile and 6.5 parts of litharge are finely powdered and admixed together and the mixture is gradually added during 15 minutes to 100 parts of boiling chloro-naphthalene. The temperature of the reaction mass is maintained at 260° C. for a further 1½ hours during which time a green colour develops and the mass thickens. The reaction mixture is then cooled. 200 parts of benzene are then added, whereupon a green solid is precipitated. The mixture is filtered and the residue is washed first with benzene and then with hot alcohol and is then dried. There is thus obtained lead tetrabenztriazaporphin in the form of a dark green powder. The compound may be purified, if desired, by crystallisation from chloronaphthalene and is then obtained in the form of bluish green crystals. The solution in chloronaphthalene is yellowish green.

Example 5

13 parts of phthalimidylacetic acid, 7.4 parts of phthalodinitrile and 6.5 parts of stannous chloride dihydrate ($SnCl_2.2H_2O$) are mixed together and the mixture is gradually added during 30 minutes to 50 parts of boiling chloronaphthalene. The temperature of the reaction mass is maintained at 250° C. for a further 3 hours during which time a green colour develops. The mass is then cooled. Benzene is then added, whereupon a green solid is precipitated. This is filtered off and washed first with benzene, then with hot ethyl alcohol and finally with acetone. It is then dried at 90° C. There is thus obtained dichlorostannic tetrabenz-triazaporphin in the form of dark green crystals. These dissolve in chloronaphthalene to give a bright green solution.

Example 6

13 parts of phthalimidylacetic acid, 9.5 parts of 4-chlorophthalodinitrile and 6 parts of cuprous chloride are finely powdered and mixed and the mixture is gradually added during half an hour to 100 parts of boiling chloronaphthalene in a vessel provided with a reflux condenser. The temperature is maintained at 260° C. for a further 1 hour. A green colour develops, a green solid separates out and the reaction mass becomes thick. It is then cooled and filtered. The residue is washed with benzene and dried, conveniently at 90° C. Copper trichloro(4)-tetrabenztriazaporphin is thus obtained as a greenish blue crystalline powder, which dissolves in chloronaphthalene to give a green solution.

The new compound may be obtained as a finely dispersed paste suitable for incorporation into paints and lacquers by dissolving it in sulphuric acid and pouring the solution into water as described in Example 1.

Example 7

If in the process of Example 6, instead of the 9.5 parts of 4-chlorophthalodinitrile there are used 11.5 parts of 3:6-dichlorophthalodinitrile, there is obtained copper hexachloro (3:6)-tetrabenztriazaporphin in the form of a dark green powder. It dissolves in chloronaphthalene to give a green solution and in sulphuric acid to give a reddish brown solution.

It may be obtained in the form of a fine paste suitable for incorporation in paints and lacquers by dissolving it in sulphuric acid and pouring the solution into water as described in Example 1.

Proceeding as above, but using, instead of the 9.5 parts of 4-chlorophthalodinitrile, 8.4 parts of 4-aminophthalodinitrile or 10 parts of 4-nitrophthalodinitrile, there is obtained in each case a dark green powder which dissolves in sulphuric acid to give a yellowish brown solution. If this solution is poured into much water a green flocculent precipitate is formed.

Example 8

12 parts of copper tetrabenztriazaporphine are mixed with 120 parts of 5% oleum and the mixture is heated to 100 C. for 20 minutes with stirring. A further 120 parts of 5% oleum are added and the temperature of the reaction mixture is maintained at 100° C. for a further 40 minutes. The mixture is then poured into 1200 parts of cold water, whereupon the sulphonic acid is precipitated. The precipitate is filtered off and the residue is washed with a small quantity of cold water. The wet paste is then dissolved in water by adding ammonia until there is a small excess. The solution is filtered and the filtrate is evaporated to dryness. The ammonium salt of the sulphonic acid is thus obtained as a dark green powder readily soluble in water to give a green solution.

This sulphonic acid dyes cotton, wool and acetate rayon a bright green shade. It is also useful for dyeing paper or for conversion into the barium lake for use, with or without admixture of white pigment (e. g. blanc fixé) in the surface colouring of paper.

Example 9

5 parts of metal-free tetrabenztriazaporphine (prepared as described in Example 2) are mixed with 100 parts of phthalic anhydride and the mixture is heated to 250° to 260° C. A stream of chlorine gas is passed through the mixture and the temperature is maintained at 250° to 260° C. for 4¾ hours. The melt rapidly becomes green. The mixture is then cooled and is washed with boiling water to remove unchanged phthalic anhydride. There is thus obtained a bright green powder. This is dissolved in twenty times its own weight of a mixture of equal parts of sulphuric acid monohydrate and chlorsulphonic acid at a temperature below 5 C., and the reddish brown solution so obtained is poured into much water.

A green precipitate is formed. This is filtered off and washed with water. The aqueous paste so obtained presents the compound in a form suitable for incorporation into paints and lacquers. If the paste is dried down a green powder is obtained. The compound so obtained contains 47.4% of combined chlorine, which corresponds with 12.7 atoms of chlorine per molecule.

If in this process there is added to the reaction mixture one part of antimony trisulphide, the time of reaction may be diminished to 1½ hours. The product so obtained is similar in every way to that obtained in accordance with the above procedure and has the same halogen content.

*Example 10*

4 parts of copper tetrabenztriazaporphine and 30 parts of phthalic anhydride are mixed together and heated to 250–260° C. and a stream of chlorine gas is passed through the melt for six hours. The mixture is then allowed to cool and the product is finely powdered and thoroughly extracted with boiling water to remove unchanged phthalic anhydride. There is thus obtained a bright green powder. It is dissolved in a mixture of sulphuric acid monohydrate and chlorsulphonic acid and the solution so obtained is poured into water as is described in Example 9. There is finally obtained a bright green powder which contains 47.5% of combined chlorine. This corresponds with 14 atoms of chlorine per molecule.

*Example 11*

3.7 parts of metal-free tetrabenztriazaporphine are suspended in 240 parts of nitrobenzene and the mixture is stirred and heated to 200° C. 45 parts of bromine are gradually added during two hours and the temperature of the mixture is maintained at 200° C. for a further three hours. The liquid is then cooled and benzene is added, whereon a green solid is precipitated. This is filtered off, washed with benzene, acetone, cold dilute aqueous sodium hydroxide and then with water. It is then dried. The compound so obtained contains 45.2% of combined bromine. This corresponds with five atoms of bromine per molecule.

The new compound may be obtained in a form suitable for incorporation in paints and lacquers by the method described in Example 9.

*Example 12*

If in the process of Example 11 there are used five parts of copper tetrabenztriazaporphine instead of 3.7 parts of metal-free tetrabenztriazaporphine and 60 parts of bromine instead of 45 parts of bromine, there is obtained a bright green compound which contains 48.7% of combined bromine and 4.3% of copper. This corresponds to seven atoms of bromine per molecule.

*Example 13*

2 parts of the brominated tetrabenztriazaporphine obtained as described in Example 12 and 30 parts of bromine are heated together in a pressure vessel for five hours at 270° C. After cooling, the pressure is released and the powder is heated to 260° C. to remove the excess of bromine. There is thus obtained a yellow-green powder which may be obtained in a finely divided form suitable for incorporation in paints and lacquers by the process described in Example 9. The compound contains 60.9% of combined bromine, which corresponds to ten atoms of bromine per molecule.

I claim:
1. Tetrabenzo-triaza-porphin.
2. A compound of the group consisting of tetrabenzo-triaza-porphin, its metallic compounds and its monovalent Bz-substitution derivatives.
3. A compound of the general formula

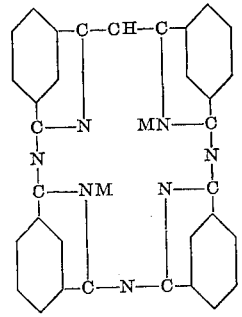

wherein M, M represent electro positive elements selected from the group consisting of two hydrogen atoms, two monovalent metallic atoms, a single divalent metallic atom, and a single divalent radical of a polyvalent metal; wherein the remaining valencies of the C atoms and N atoms shown are satisfied by double bonds running from one to the other within the configuration, and wherein the free positions of the phenylene nuclei are satisfied by a member of the group consisting of hydrogen and substituents capable of taking the place of hydrogen in aryl nuclei.

4. A compound as in claim 3, in which the free positions of the phenylene nuclei are partly satisfied by halogen.
5. A compound as in claim 3, in which the free positions of the phenylene nuclei are partly satisfied by sulpho groups.
6. The process of producing a tetrabenzo-triaza-porphin, which comprises reacting methylene phthalimidine with phthalonitrile in the presence of a metalliferous substance.
7. A process as in claim 6, the methylene phthalimidine being produced in situ from phthalimidyl-acetic acid.
8. The process of producing a tetrabenzo-triaza-porphin, which comprises heating a mixture of phthalimidyl-acetic acid with phthalonitrile and a metalliferous substance in the presence of an inert diluent.
9. A process as in claim 8, in which the metalliferous substance is selected from the group consisting of copper and compounds containing copper.
10. A process as in claim 8, in which the metalliferous substance is selected from the group consisting of magnesium and compounds of magnesium.
11. A process as in claim 8, in which the metalliferous substance is selected from the group consisting of magnesium and compounds of magnesium, said process being followed by the additional step of dissolving the reaction product in concentrated sulphuric acid and reprecipitating the same to give the corresponding metal-free compound.
12. Process for the manufacture of new intensely coloured heterocyclic compounds which comprises causing to interact together an o-dinitrile of the benzene or naphthalene series, a methylene phthalimidine and a substance capable of yielding a metal under the conditions of the reaction.
13. A sulphonated tetrabenzo-triaza-porphin.

14. A sulphonated metallic compound of tetrabenzo-triaza-porphin.

15. A tetrabenzo-triaza-porphin containing halogen in the benzene nuclei.

16. Halogenated copper - tetrabenzo - triaza-porphins.

17. A compound of the triaza-porphin series having the empirical constitution $$C_{33}H_{17-x}Cl_xN_7M$$

wherein M stands for two hydrogen atoms or a metal, while $x$ has a value between 1 and 17.

18. A process of producing halogen derivatives of tetrabenzo-triaza-porphins, which comprises subjecting a tetrabenzo-triaza-porphin to halogenation in the presence of a halogen carrier.

CHARLES ENRIQUE DENT.

Certificate of Correction

Patent No. 2,166,240.

July 18, 1939.

CHARLES ENRIQUE DENT

It is hereby certified that error appears in the printed specification of the above numbered patent requiring correction as follows: Page 4, second column, lines 7 to 20, inclusive, claim 3, strike out the formula and insert instead the following—

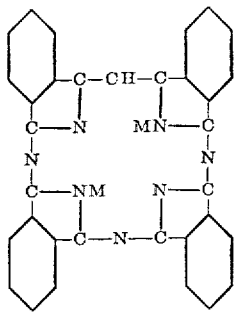

and that the said Letters Patent should be read with this correction therein that the same may conform to the record of the case in the Patent Office.

Signed and sealed this 19th day of September, A. D. 1939.

[SEAL]

HENRY VAN ARSDALE,
*Acting Commissioner of Patents.*